(12) United States Patent
Szoke

(10) Patent No.: US 7,797,448 B1
(45) Date of Patent: Sep. 14, 2010

(54) GPS-INTERNET LINKAGE

(76) Inventor: Ernest G Szoke, 6 Mercergate Dr., Doylestown, PA (US) 18901

( * ) Notice: Subject to any disclaimer, the term of this patent is extended or adjusted under 35 U.S.C. 154(b) by 1226 days.

(21) Appl. No.: 09/699,192

(22) Filed: Oct. 28, 2000

Related U.S. Application Data

(60) Provisional application No. 60/162,169, filed on Oct. 28, 1999.

(51) Int. Cl.
*G06F 15/16* (2006.01)

(52) U.S. Cl. ............... 709/245; 709/202; 709/205; 709/217; 709/227; 709/237; 709/249; 701/207; 701/208; 701/209; 701/213; 701/214; 701/216

(58) Field of Classification Search ............... 709/205, 709/217, 249, 245, 202, 225, 228, 237; 455/428, 455/456, 457, 456.1; 701/207, 208, 209, 701/213, 214, 216
See application file for complete search history.

(56) References Cited

U.S. PATENT DOCUMENTS

| | | | | |
|---|---|---|---|---|
| 5,602,903 A * | 2/1997 | LeBlanc et al. | ......... | 455/456.2 |
| 5,636,122 A * | 6/1997 | Shah et al. | ......... | 701/207 |
| 5,652,717 A * | 7/1997 | Miller et al. | ......... | 703/6 |
| 5,940,739 A * | 8/1999 | Conrad et al. | ......... | 455/13.1 |
| 5,946,618 A * | 8/1999 | Agre et al. | ......... | 455/428 |
| 6,104,815 A * | 8/2000 | Alcorn et al. | ......... | 380/251 |
| 6,128,501 A * | 10/2000 | Ffoulkes-Jones | ......... | 455/456.3 |
| 6,148,211 A * | 11/2000 | Reed et al. | ......... | 455/456.2 |
| 6,169,902 B1 * | 1/2001 | Kawamoto | ......... | 455/456.4 |
| 6,199,099 B1 * | 3/2001 | Gershman et al. | ......... | 709/203 |
| 6,208,857 B1 * | 3/2001 | Agre et al. | ......... | 455/428 |
| 6,236,365 B1 * | 5/2001 | LeBlanc et al. | ......... | 342/457 |
| 6,243,039 B1 * | 6/2001 | Elliot | ......... | 342/457 |
| 6,292,747 B1 * | 9/2001 | Amro et al. | ......... | 701/213 |
| 6,327,535 B1 * | 12/2001 | Evans et al. | ......... | 701/300 |
| 6,343,317 B1 * | 1/2002 | Glorikian | ......... | 709/218 |
| 6,351,221 B1 * | 2/2002 | Phillips et al. | ......... | 340/825.49 |
| 6,529,136 B2 * | 3/2003 | Cao et al. | ......... | 340/686.1 |
| 6,553,236 B1 * | 4/2003 | Dunko et al. | ......... | 455/456.1 |
| 6,677,858 B1 * | 1/2004 | Faris et al. | ......... | 340/573.1 |
| 6,912,398 B1 * | 6/2005 | Domnitz | ......... | 455/461 |
| 7,143,130 B2 * | 11/2006 | Lin | ......... | 709/203 |
| 7,606,938 B2 * | 10/2009 | Roese et al. | ......... | 709/242 |
| 2003/0097408 A1 * | 5/2003 | Kageyama et al. | ......... | 709/205 |
| 2004/0236501 A1 * | 11/2004 | Hirose et al. | ......... | 701/200 |

OTHER PUBLICATIONS

MSN Search Result for Global Positioning System.

* cited by examiner

*Primary Examiner*—Michael Won
(74) *Attorney, Agent, or Firm*—Henry E. Millson, Jr.

(57) ABSTRACT

An integrated system comprising the Global Positioning System and the Internet wherein the integrated system can identify the precise geographical location of both sender and receiver communicating computer terminals.

13 Claims, 1 Drawing Sheet

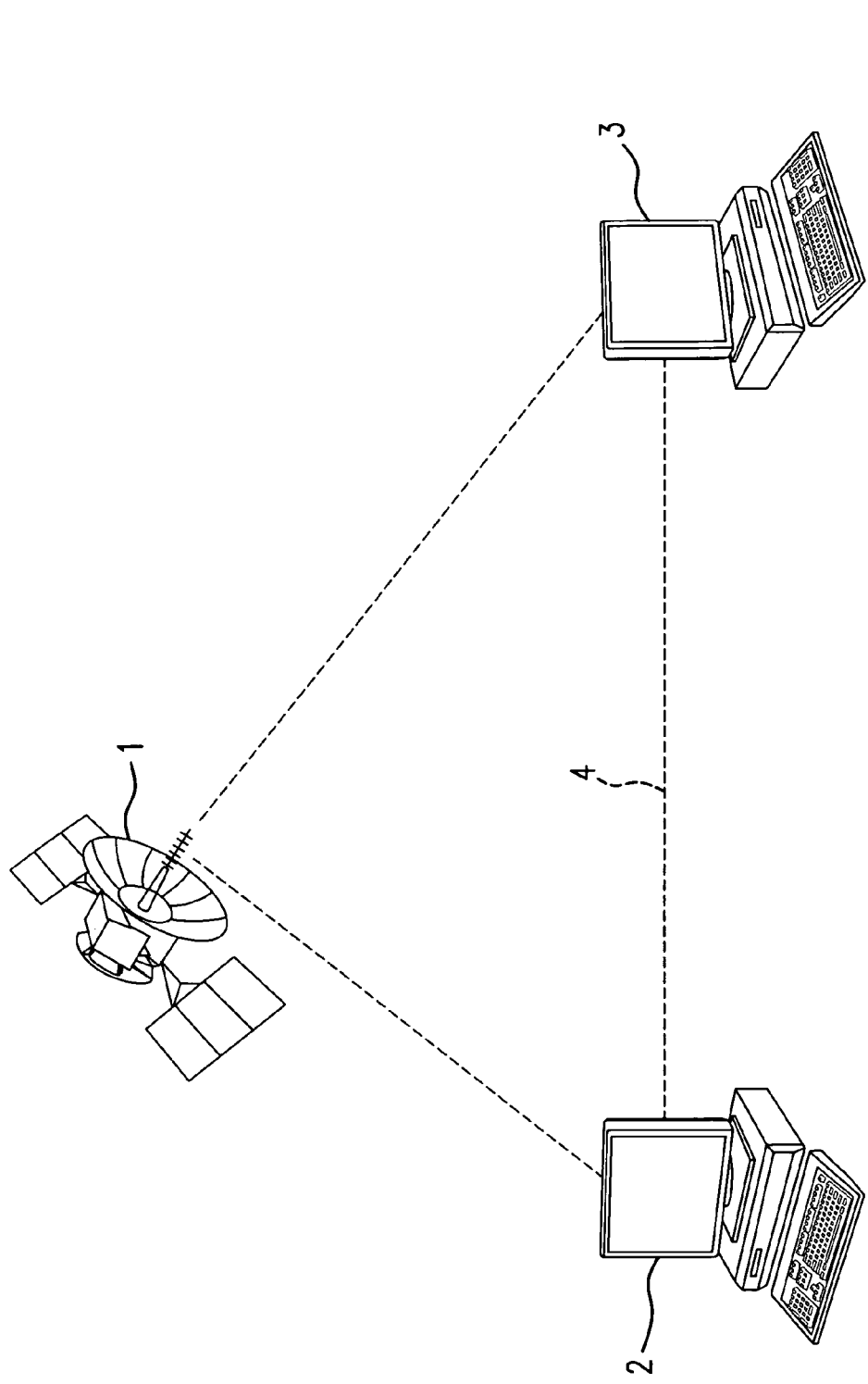
FIGURE

GPS-INTERNET LINKAGE

This application claims priority from provisional application Ser. No. 60/162,169, filed Oct. 28, 1999

FIELD OF INVENTION

This invention pertains to the Global Positioning System and the Internet.

BRIEF DESCRIPTION OF THE DRAWING

The attached drawing (FIGURE) shows an integrated system between a global positioning communication satellite and the Internet.

STATEMENT OF THE INVENTION

This invention relates to the integration of the Global Positioning System ("GPS") into the Internet.

This integration can be achieved either electronically or by the direct integration of GPS units into computers. In this way, a communications satellite is also a global positioning system communicator, so that the communicator can identify both the originator and the receiver of the communication.

When this integration is achieved, each GPS integrated computer terminal communicating on the Internet will be identified by its exact global location and the time the communication was sent, so that both the sending and receiving terminals can immediately confirm the precise geographic location of the other terminal, i.e. of the receiving terminal for the sending terminal, and of the sending terminal for the receiving terminal.

This integrated system can provide a positive identification of both the sender and the receiver based upon their geographic locations since the GPS can determine locational accuracy on an order of magnitude of the computer terminal itself.

For applications such as business-to-business E-Commerce where communications are from fixed and known business locations, this integrated system provides the means for automatic positive identification of both the sending and receiving parties to protect their terminals. The authenticity of the communication is thereby confirmed. Of course, one or more additional identifiers can also be used to provide maximum confirmation of the identities of the communicating parties. This system permits the conforming of a web domain to a geographic domain.

This integrated system can additionally be coupled directly to the telephone system through the modem in the computer or through other phone systems, especially digital phone systems, and similar digital communication devices, to provide further flexibility.

This linkage of GPS positioning and Internet communication systems for senders and receivers can be achieved by appropriate programming or by the integration of the GPS unit and the computer terminal in any suitable manner, which will be apparent to those skilled in this art. For example, software can be specifically adapted to refuse transmissions that do not have the location identifier. This can inhibit or prevent hackers from entering computer terminals as well as reducing or eliminating the introduction of computer viruses into terminals.

The above integrated system provided by this technology can be used for a wide variety of applications in addition to providing secure transmissions between GPS tagged terminals. For example, it allows for the creation of localized networks based upon geographic proximity. By way of illustration, it will enable the creation of subsets of the worldwide web that can be restricted geographically to a particular language area. Users can then access it if they are conversant in the particular language. Search engines can be designed for greater efficiency to either go directly to such subset or subsets and limit the search for specific information within that subset or subsets only, or the search can exclude such subsets entirely. For E-Commerce it permits instantaneous and automatic means for determining the most efficient loading and routing for the delivery of multiple orders comprising less that a truckload in size.

This integrated system can, moreover, provide a basis for targeting communications to a specific geographic region only. It enables the creation of geographically defined networks whereby information of local interest only is more readily accessible because the subset of geographically tagged information limits the field that needs to be searched for information to the geographic area of interest. For census data the information can be automatically targeted to the precise geographic location as well as the individuals in the geographic area. A census taker or pollster equipped with a computer terminal integrated with GPS will automatically generate data that is locale prospects within specified geographic areas.

The integration of GPS and Internet digital communication by linking GPS units and computer terminals provides the means for anchoring every digital message in time and space. All computer messages are already linked to time. The GPS linkage adds another dimension that is as unobtrusive as the time dimension currently linked to every communication, with the unlimited added advantage that can be derived by knowing not only the time but also the precise geographic origin of every digital transmission of information. In this broad sense the invention encompasses the integration of GPS with each and every source of digital information, since the creation of digital information depends upon physical equipment which when linked to GPS enables the creation of the digital information to be automatically fixed in both time and space as it is created.

The attached FIGURE shows an integrated system within the scope of the invention in which a global positioning communications satellite (1) determines the precise location of a sending computer terminal (2) and a receiving computer terminal (3) which are communicating by means of the Internet (4).

What is claimed is:

1. An integrated system comprising the Global Positioning System, the Internet, a sending computer terminal, and a receiving computer terminal, wherein said computer terminals are each positioned with a GPS unit so that the Global Positioning System identifies the global locations of both the sending computer terminal and the receiving computer terminal, and wherein the computer terminals communicate with each other over the Internet.

2. The integrated system of claim 1 wherein the integration is achieved by a direct integration of Global Positioning System units into the computer terminals.

3. The integrated system of claim 1 wherein the system is coupled directly into a telephone network or into a digital communication system utilizing other than a telephone network.

4. The integrated system of claim 1 that creates localized computer networks based on geographic proximity.

5. The integrated system of claim 1 wherein the Global Positioning System comprises at least one global positioning communication satellite.

6. The integrated system of claim 1 wherein the system provides automatic identification of the receiving computer terminal for the sending computer terminal and automatic identification of the sending computer terminal for the receiving computer terminal.

7. The integrated system of claim 1 wherein the integration is achieved electronically.

8. A method for identifying the global location of both an originating computer terminal and a receiving computer terminal communicating on the Internet wherein said method uses the integrated system of claim 1.

9. The integrated system of claim 1 wherein the system anchors every digital message communicated between the sending computer terminal and the receiving computer terminal over the Internet in both time and space.

10. The integrated system of claim 1 wherein the system can refuse transmissions that do not have a location identifier.

11. The integrated system of claim 1 wherein the system consists essentially of the Global Positioning System, the Internet, a sending computer terminal, a receiving computer terminal, and GPS units positioned with each computer terminal.

12. The integrated system of claim 1 wherein the system is used for business-to-business E-commerce communications and confirms the authenticity of communications of business-to-business E-commerce between fixed and known business locations.

13. An integrated system comprising the Global Positioning System, the Internet, and two computer terminals positioned at different locations, wherein each computer terminal is positioned with a GPS unit so that each computer terminal can identify the global location of the other computer terminal, and wherein the computer terminals communicate with each other over the Internet.

* * * * *